Figure 1:
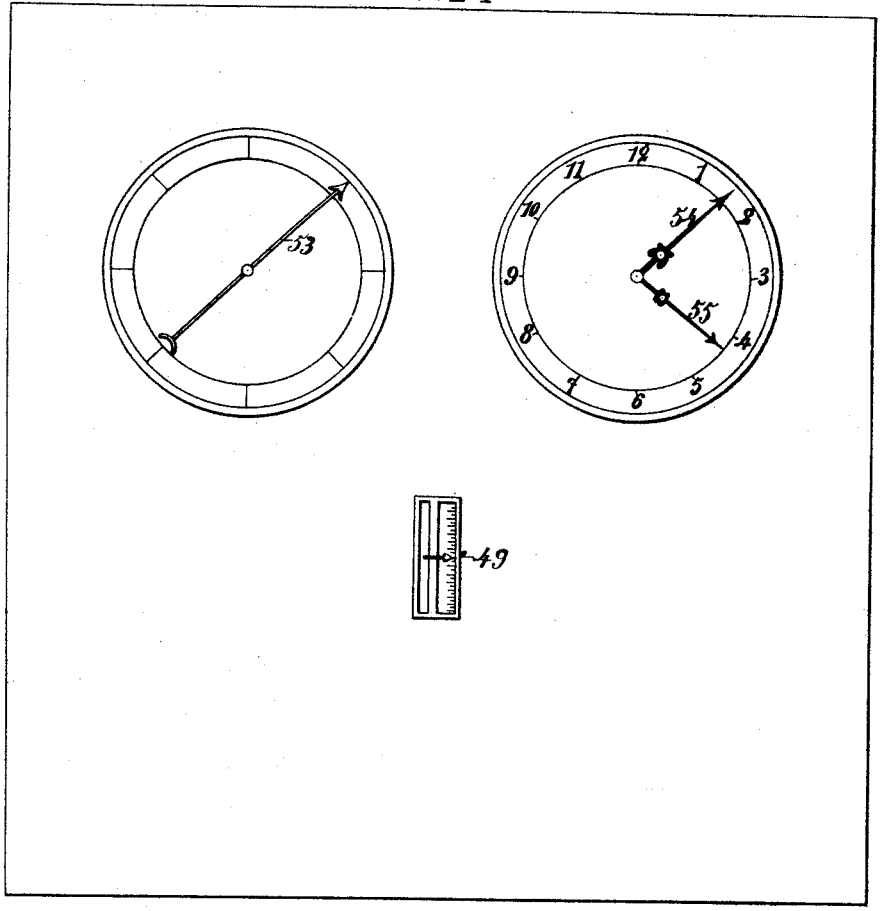

No. 620,903. Patented Mar. 14, 1899.
E. FAYE & G. S. J. B. BOCHET.
INDICATING AND RECORDING APPARATUS FOR VEHICLES.
(Application filed Aug. 21, 1896.)
(No Model.) 9 Sheets—Sheet 3.

No. 620,903. E. FAYE & G. S. J. B. BOCHET. Patented Mar. 14, 1899.
INDICATING AND RECORDING APPARATUS FOR VEHICLES.
(Application filed Aug. 21, 1896.)

(No Model.) 9 Sheets—Sheet 4.

No. 620,903. Patented Mar. 14, 1899.
E. FAYE & G. S. J. B. BOCHET.
INDICATING AND RECORDING APPARATUS FOR VEHICLES.
(Application filed Aug. 21, 1896.)
(No Model.) 9 Sheets—Sheet 5.
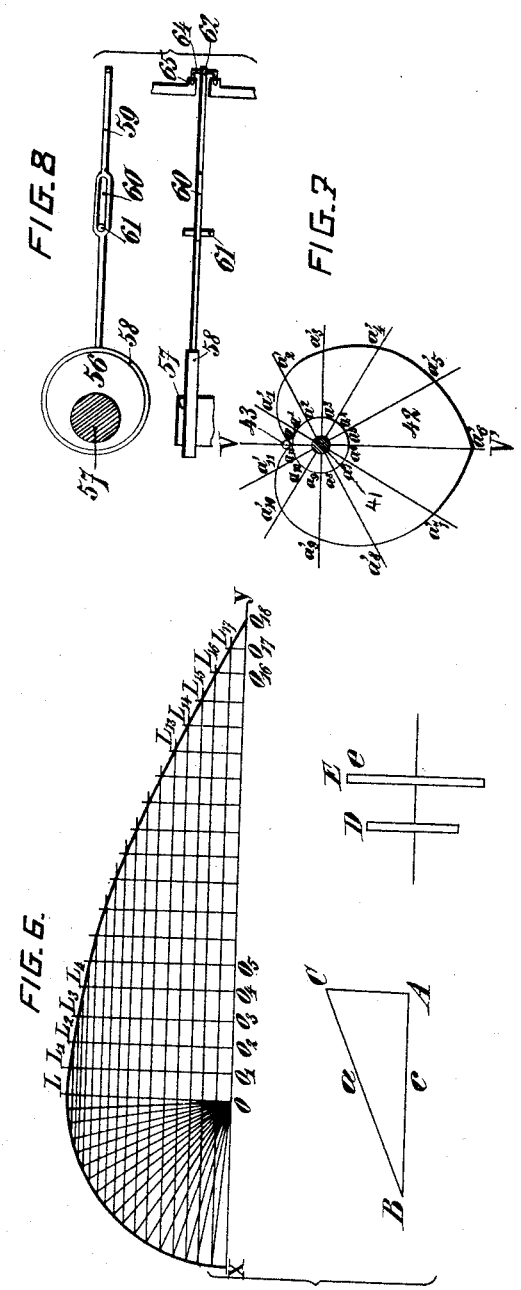

No. 620,903. Patented Mar. 14, 1899.
E. FAYE & G. S. J. B. BOCHET.
INDICATING AND RECORDING APPARATUS FOR VEHICLES.
(Application filed Aug. 21, 1896.)
(No Model.) 9 Sheets—Sheet 6.

No. 620,903. Patented Mar. 14, 1899.
E. FAYE & G. S. J. B. BOCHET.
INDICATING AND RECORDING APPARATUS FOR VEHICLES.
(No Model.) (Application filed Aug. 21, 1896.) 9 Sheets—Sheet 7.
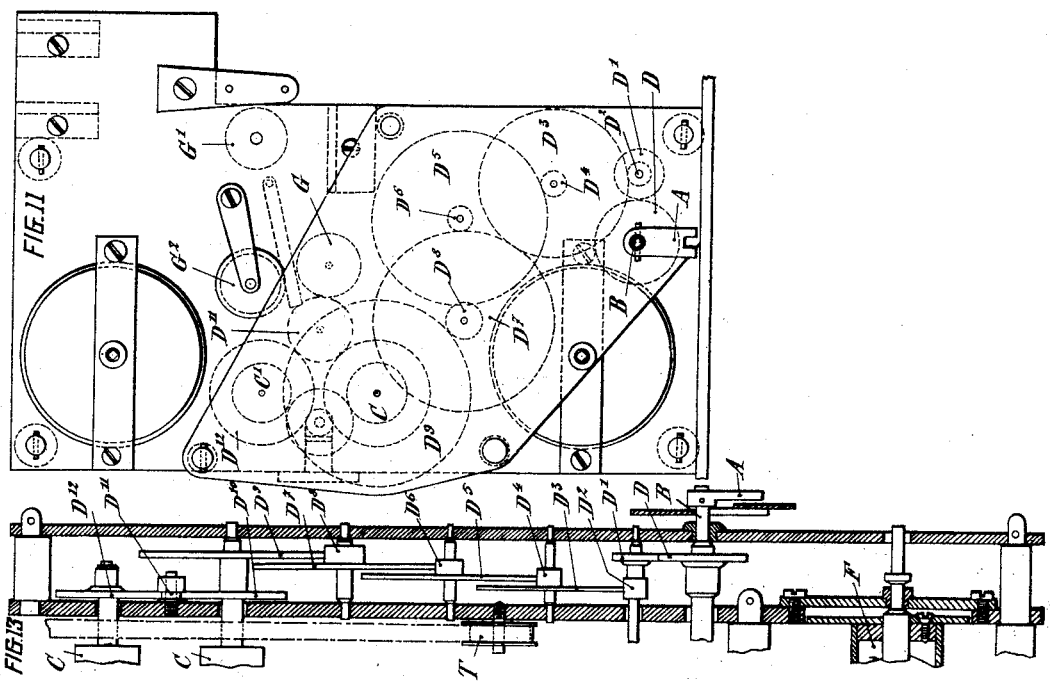

No. 620,903. Patented Mar. 14, 1899.
E. FAYE & G. S. J. B. BOCHET.
INDICATING AND RECORDING APPARATUS FOR VEHICLES.
(Application filed Aug. 21, 1896.)

(No Model.) 9 Sheets—Sheet 8.

Witnesses
R. Aberli
Fred E. Muse

Inventors
E. Faye and G. S. J. B. Bochet
By v. Briesen & Knauth
Attorneys

THE NORRIS PETERS CO., PHOTO-LITHO., WASHINGTON, D. C.

No. 620,903. Patented Mar. 14, 1899.
E. FAYE & G. S. J. B. BOCHET.
INDICATING AND RECORDING APPARATUS FOR VEHICLES.
(Application filed Aug. 21, 1896.)
(No Model.) 9 Sheets—Sheet 9.
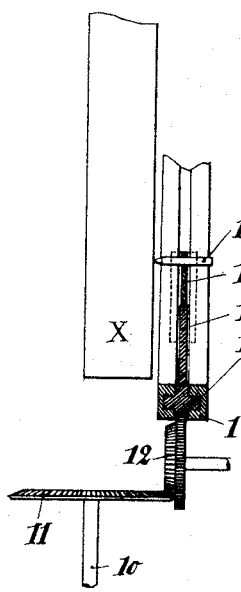
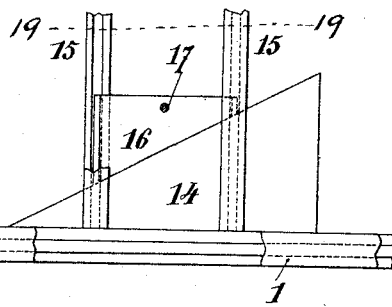
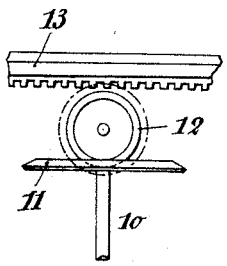
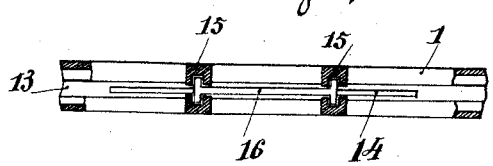
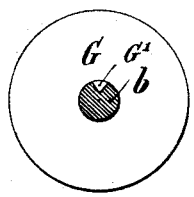
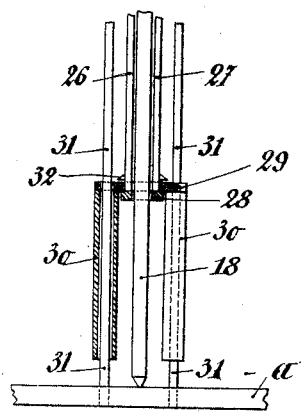

UNITED STATES PATENT OFFICE.

ENNEMOND FAYE AND GEORGES STEPHANE JEAN BAPTISTE BOCHET, OF LYONS, FRANCE.

INDICATING AND RECORDING APPARATUS FOR VEHICLES.

SPECIFICATION forming part of Letters Patent No. 620,903, dated March 14, 1899.

Application filed August 21, 1896. Serial No. 603,455. (No model.)

*To all whom it may concern:*

Be it known that we, ENNEMOND FAYE and GEORGES STEPHANE JEAN BAPTISTE BOCHET, of the city of Lyons, Rhône, France, have invented Indicating and Recording Apparatus for Vehicles and more especially for Railway-Vehicles, (for which we have obtained Letters Patent in France for fifteen years, dated December 14, 1895, No. 252,571,) of which the following is a full, clear, and exact description.

This invention relates to apparatus for indicating and recording all the movements of a vehicle, more especially railway-vehicles.

The apparatus indicates and records the speed at every point, the stoppages, recoil movements, skidding, the time at which the train passes any point, the time of arrival and departure from a station, the time of stoppage, the condition or stability of the permanent way, and also all shocks, gradients, and the horizontal distance traveled. It also enables the driver to have constantly under observation a record of the gradient of the line and the speed at which the train is traveling, so as to enable the engine to be driven at a normal speed and the brakes to be applied at the proper moment to reduce the speed on descending gradients when a speed which would be safe on a level might be dangerous.

The apparatus gives both graphic and visual indications. It records graphically, first, the horizontal distance traveled, which serves as the base for the lines indicating the gradient; second, the gradient of the road traveled; third, the state of the line, as indicated by shocks; fourth, the speed at each point of the line, and, fifth, the time and therefrom the recoil and slip. It also indicates at a glance, first, the gradient; second, the speed, and, third, the time.

The invention is illustrated in the accompanying drawings, wherein—

Figure 2:
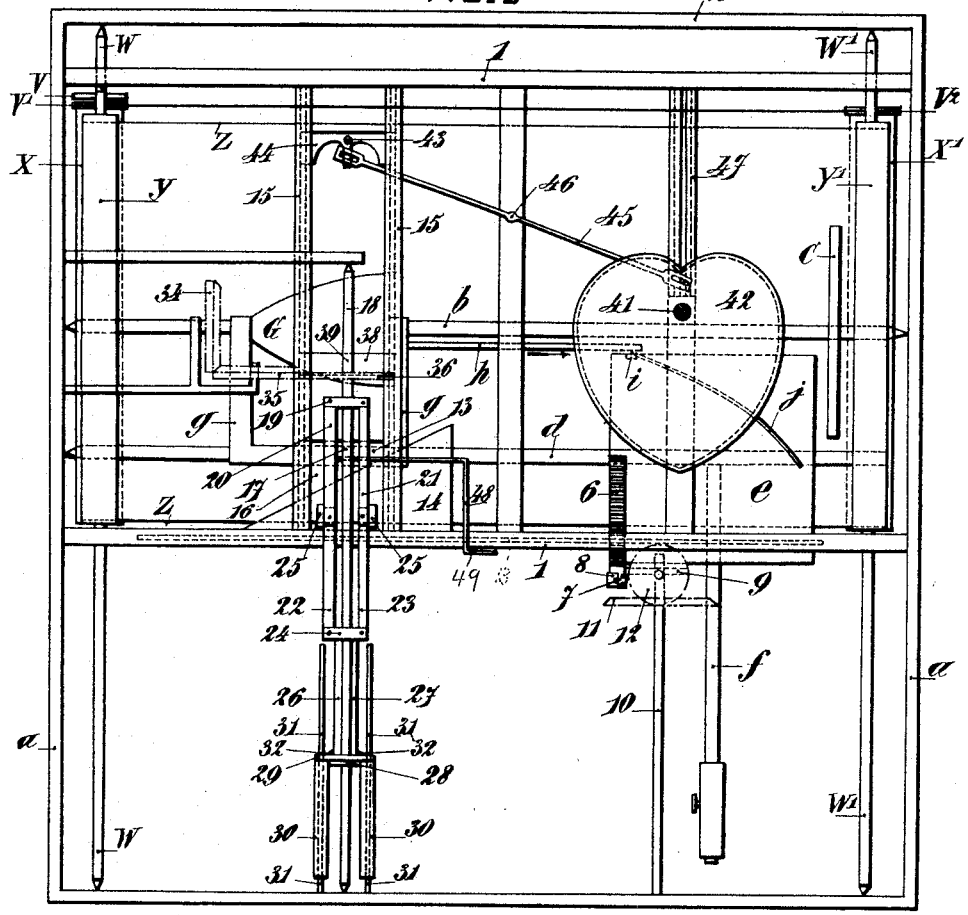
Figure 3:
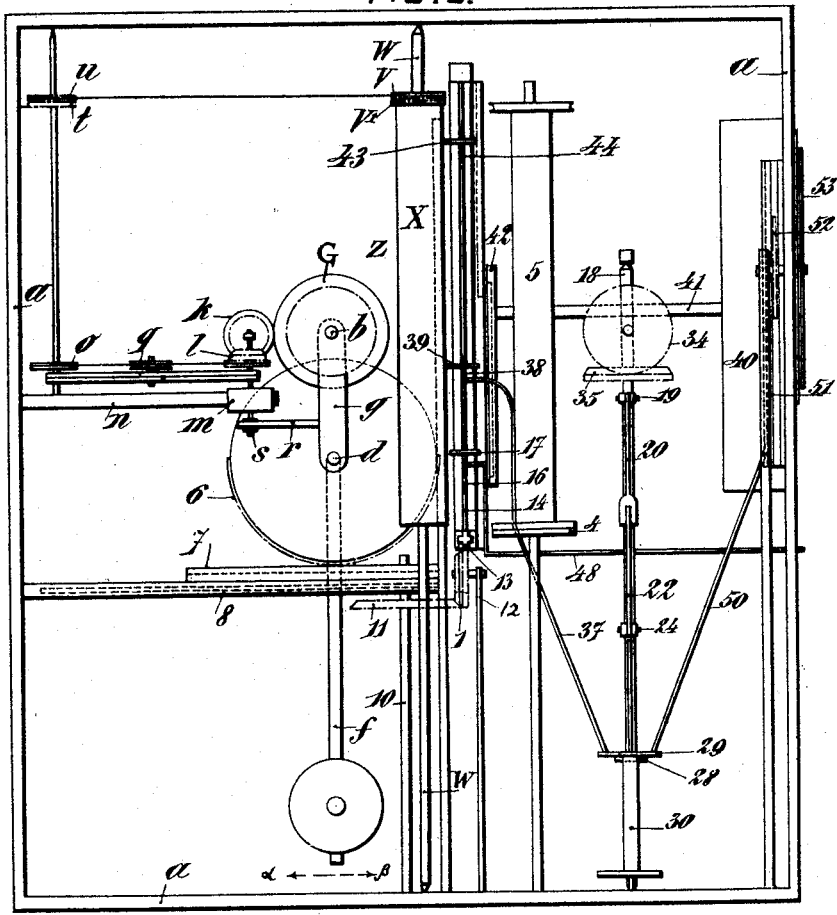
Figure 4:
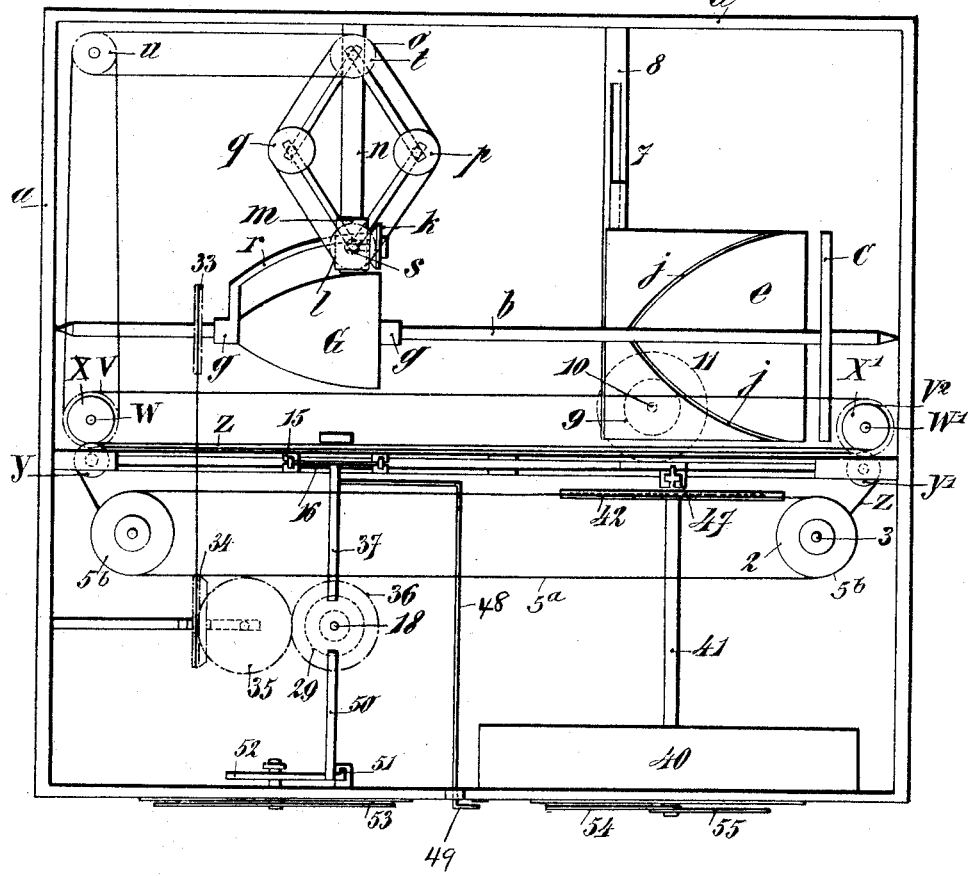
Figure 14:
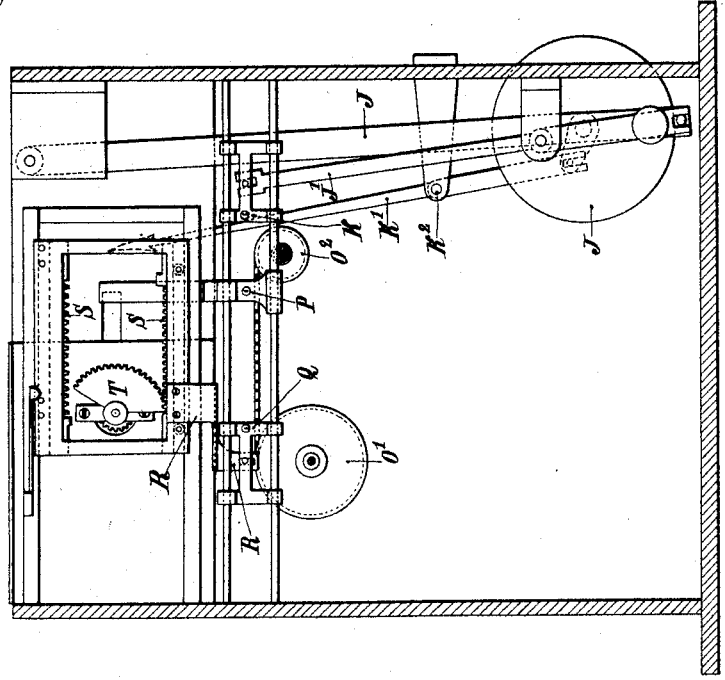

Figure 1 represents an external face view, Fig. 2 an interior face view, Fig. 3 a side view, and Fig. 4 a plan, of the apparatus. Fig. 5 represents the several diagrams produced by the apparatus. Fig. 6 illustrates the principle on which is based the construction of the device for recording the horizontal distance traveled. Fig. 7 represents the cam by means whereof the time-record is obtained. Fig. 8 represents the operative mechanism by means of which the motion of the vehicle is transmitted to the indicating and recording apparatus. Figs. 9 to 14 represent a modification of the apparatus, Fig. 9 being a plan, Fig. 10 an elevation, and Figs. 11 and 12 opposite end views. Fig. 13 shows a side view of the wheelwork represented in Fig. 11. Fig. 14 is an elevation of a modified arrangement of time-recording device. Fig. 15 is a sectional view showing the loose connection of the solid G to its shaft. Fig. 16 is a detail view of part of the mechanism for moving the gradient-recording device. Fig. 17 is a vertical sectional view of part of the gradient-recording device. Fig. 18 is a front view of the parts shown in Fig. 17. Fig. 19 is a section on line 19 19 of Fig. 18, and Fig. 20 is a sectional detail view of the lower part of the speed-recording mechanism.

The same letters of reference denote like parts in all the figures.

Before commencing the detailed description of the apparatus and of the device for recording the horizontal distance traveled we will explain the general principles on which the form of this device, which we will term the "solid G," is based.

If the horizontal distance B A, Fig. 6, be traveled by a wheel which transmits motion to a wheel D, on the axis of which is a wheel E, a point $e$ on the circumference of the latter will indicate by its movement to a certain scale the horizontal distance B A traveled. If, now, starting from B, the distance B C is traveled, the point $e$ by its movement will indicate to a certain scale the distance B C—that is to say, the point $e$ will have a greater extent of motion, since $B C > B A$. If with the same means it is desired to measure in plan the distance B C traveled—that is to say, its projection B A—it is necessary that the point $e$ should travel the same distance in both cases. This is, however, impossible, as the number of revolutions of wheel E must necessarily be greater when the distance B C is traveled instead of B A, since $B C > B A$. The greater the angle B the greater the length B C and the greater the number of revolutions of the wheel.

$$\frac{c}{a} = \cos. \text{B} \quad (1)$$

Let $n$ be the number of revolutions of wheel E when the distance B A is traveled. Let $n'$ be the number of revolutions of wheel E when the distance B C is traveled. Let R be the radius of wheel E $$2\pi \text{R} n = c$$
$$2\pi \text{R} n' = a$$

Dividing the one equation by the other, we have:

$$\frac{n'}{n} = \frac{c}{a}$$

$$\frac{c}{a} = \cos. \text{B} \quad (1)$$

Therefore $$\frac{n'}{n} = \cos. \text{B} \quad (2)$$

In order to solve the problem, it is necessary that $$2\pi \text{R} n = 2\pi \text{R} n'$$

which is impossible, as $2\pi \text{R}$ is common and $n$ always differs from $n'$. To make this equation possible, R must vary, and consequently if R is the radius of wheel E in traveling from B to A, R' should be the radius of wheel E when traveling from B to C, and the length of B C varying with the angle B, R' will be a quantity varying as the angle B. In any case whatever may be the value of angle B we must have $$2\pi \text{R} n = 2\pi \text{R}' n'$$

or $$\text{R} n = \text{R}' n'$$

or $$\frac{n'}{n} = \frac{\text{R}'}{\text{R}} \quad (3)$$

Comparing the equations (2) and (3), we have $$\frac{\text{R}'}{\text{R}} = \frac{n}{n'} = \cos. \text{B}$$

whence $$\text{R}' = \text{R} \cos. \text{B}. \quad (4)$$

If then the radius of wheel E could vary as the cosine of angle B, the point $e$, whatever may be angle B, would always indicate by its distance moved to a certain scale the horizontal distance traveled. As the radius of the wheel E cannot vary, we substitute for it a solid G, generated by a curve varying as the cosine of angle B and whose radius consequently varies as the cosine B. By shifting the solid G in the direction of its axis according to the value of angle B it will transmit different speeds to a wheel of invariable radius, and a fixed point upon the circumference of said wheel will always give to a certain scale the horizontal distance traveled whatever may be the value of the angle B. From the formula (4) this solid G is obtained as follows: Upon a line X Y, Fig. 6, is erected a perpendicular O L at point O. From this point as a center with R as radius a quadrant of a circle is described to the left of the perpendicular. From point L this quadrant is divided into eighteen parts of five degrees, and from these points of division perpendiculars are let fall on the right line O L. To the right of O upon X Y are set off eighteen equal parts, and from these points of division are erected perpendiculars which meet those drawn to O L from the points of division of the quadrant, the first perpendicular erected on X Y coördinating with the first erected on O L, the second erected on X Y with the second erected on O L, and so on.

$$\text{O L} = \text{R} = \cos. \ 0 \text{ degrees.}$$
$$\text{O}' \text{L}' \quad = \cos. \ 5 \text{ degrees.}$$
$$\text{O}^2 \text{L}^2 \quad = \cos. \ 10 \text{ degrees.}$$
$$\cdot \quad \cdot \quad \cdot \quad \cdot \quad \cdot \quad \cdot$$
$$\text{O}^{17} \text{L}^{17} \quad = \cos. \ 85 \text{ degrees.}$$
$$\text{O}^{18} \quad = \text{O} = \cos. \ 90 \text{ degrees.}$$

By connecting the points L L' L² to L¹⁷ L¹⁸ a curve is obtained whose distance from axis Y varies from R—that is to say, cos. 0° to zero—that is to say, cos. 90°. This curve by revolving about X Y generates the solid G. The curve may be more exactly obtained by dividing the quadrant into ninety or one hundred and eighty parts, for example, and O — O¹⁸ also into ninety or one hundred and eighty parts. The length of the solid G is arbitrarily fixed. The curvature of its surface is determined as above. This being understood, we will now proceed to describe the apparatus which forms the subject of the present invention.

The parts of the mechanism are inclosed in a metal casing $a$, in the sides of which are mounted the spindles and cross-rods, which carry all parts of the apparatus. The solid G, above referred to, is mounted upon a spindle $b$ by a feather or spline connection or tenon G', (see Fig. 15,) upon which a wheel $c$ is mounted, which wheel receives motion and transmits it to the spindle $b$ of the solid G, which is capable of sliding on its spindle without ceasing to rotate. Upon a shaft $d$, Figs. 2 and 3, is mounted a cam-cylinder $e$, which partakes of the movement of a pendulum $f$, fixed on spindle $d$ at the middle of the cylinder. A stirrup-piece $g$, Fig. 2, sliding on axes $b\ d$ and embracing between its limbs the solid G is caused to slide longitudinally by the oscillation of the cam $e$ in one or other direction by the pendulum $f$ and to carry the solid G with it. For this purpose one limb of stirrup-piece $g$ has an arm $h$, carrying a roller $i$, which engages in the groove $j$ of cam $e$. When the vehicle upon which the apparatus is carried is on an ascending gradient, the pendulum $f$ moves toward $\beta$, Fig. 3, rotating the cam $e$, whereby the groove $j$ moves roller $i$, (which is prevented from partaking of the circular motion,) and consequently rod $h$, stirrup-piece $g$, and solid G, in the direction of the arrow, Fig. 2, a similar effect being produced, but in the reverse direction, when the vehicle is on a down gradient. Thus if the vehicle were on an ascending gradient making an angle of ninety degrees with the horizon, the pendulum $f$ would move toward $\beta$, Fig. 3, making with its normal position (which is that which it occupies relatively to the apparatus when the vehicle is on a level) an angle of ninety degrees and moving the solid G along its axis a distance equal to the length of said solid. In the case of a gradient making an angle of one degree with the horizon the solid G will be moved longitudinally upon its axis one-ninetieth of its length and for an angle of $n$ degrees it will be moved $\frac{n}{90}$ths of its length.

The solid G transmits by friction to wheel $k$ the rotary motion which it receives from axis $b$, which is driven by wheel $c$. The wheel $k$ is made in two parts, one of which is in frictional contact with solid G, while the other part is toothed and transmits motion to wheel $l$, the wheels $k\,l$ being carried on a sleeve $m$, capable of sliding longitudinally upon a rod $n$. The wheel $l$ transmits motion to a wheel $o$ by means of a chain passing around grooved pulleys $p\,q$, placed at the opposite angles of a jointed parallelogram, at the centers of whose two other angles are the wheels $l\,o$, so that whatever may be the position of sleeve $m$ upon rod $n$ the chain connecting the wheels $l\,o$ will be always under tension of the chains. Therefore when the vehicle carrying the apparatus makes any angle whatever with the horizon the solid G will be slid upon its axis $b$, the wheel $k$, in order that it may always receive motion therefrom, being maintained in frictional contact with the solid G by means of a fixed flexible arm $r$, Figs. 3 and 4, fixed to the stirrup-piece $g$ and parallel to the face of the solid G. This arm $r$ bears upon a roller $s$ at the under side of sleeve $m$, as shown in Fig. 3, so that when the pendulum $f$ moves the cam $e$ in a direction tending to draw the solid G toward the cam, the arm $r$, which moves therewith, draws sleeve $m$ toward the spindle $b$, and thus maintains the contact between wheel $k$ and solid G. The chain-wheel $o$ is keyed on the same spindle with a chain-wheel $t$, whence motion is transmitted by a chain to a double chain-wheel $u$, Figs. 3 and 4, whence motion is transmitted by another chain to a wheel V, Figs. 2, 3, and 4, its shaft W, and a roller X keyed thereon. Between this roller X and another roller Y passes a band of paper Z, which is carried along by the contact of these rotating rollers, so that it receives its movement from the solid G, and consequently the length of the band wound off indicates to a certain scale the horizontal distance traveled, this result being due to the form and longitudinal movement of the solid G. Upon the shaft W of roller X, Figs. 2 and 3, beneath wheel V, is another wheel V', which transmits motion by means of a chain to a wheel $V^2$ on the opposite side of the machine, (see Figs. 2 and 4,) upon a shaft W', carrying a roller X', Figs. 2 and 4, between which and a roller Y' the band of paper also passes. The motion transmitted from wheel V' to wheel $V^2$ reverses the movement of the paper in case of backward movement of the vehicle, and always maintains it in tension between rollers X X', between which rollers the different pencils for inserting thereon the graphic records are situated.

Cross-bars 1 1 are provided in which are journaled the shafts of rollers $y\,y'$. The paper band during the forward movement of the train unwinds from reel 2, Fig. 4, carried on a spindle 3, which is provided with a friction-disk 4, supporting the reel. The band passes thence between the rollers X' Y' and X Y and is then wound on reel 5. The reels are provided at their upper ends with pulleys $5^b$ $5^b$, which are geared together by an endless cord $5^a$, whereby when the paper band is moved by the rollers X X' it winds off reel 2 and is wound upon reel 5, and conversely on the backward movement. By the foregoing arrangement the horizontal distance traveled is indicated to a certain scale by the length of the paper band wound off. The gradient is recorded by a toothed segment 6, Figs. 2 and 3, encircling the lower half of the cam-cylinder $e$, which gears with a rack 7, (see Figs. 2, 3, and 4,) sliding upon a rod or way 8. This rack is also toothed on its side and gears with a wheel 9, (see Figs. 2 and 4,) fast on a spindle 10, carrying a bevel-wheel 11, which gears with a bevel-pinion 12, Figs. 2 and 3, having a second circle of teeth gearing with a rack 13, sliding on the lower cross-bar 1, (see Figs. 3, 16, and 17.) This rack does not rise above the bar 1, and supports a cam-plate 14, Figs. 2, 17, 18, and 19, having an inclined upper edge upon which rests a vertically-sliding plate 16, fitted to move up and down in vertical guides 15, slotted for the passage of the inclined cam-plate or cam 14. When the vehicle is on an upward or downward gradient, the pendulum $f$, Fig. 3, moves toward $\beta$ or $\alpha$, and by the rack-and-pinion mechanism described imparts longitudinal movement to the inclined cam 14, which is moved toward the left or right, so as to raise or lower the slide 16, which carries a pencil-holder 17 (see Fig. 3) for marking the gradients upon the paper band Z. For example, supposing the dimensions and extent of motion of the inclined cam 14 are calculated to record angles not exceeding thirty degrees, when the vehicle is on a level a vertical line passing through the axis of the pencil will bisect the hypotenuse of the triangular plate 14, and when the gradient rises, making an angle of thirty degrees to the horizon, the cam 14 is advanced toward the left of Figs. 2 and 18 a distance equal to one-half of its base, and the vertical passing through the axis of the pencil then coincides with the small right-angled side of the triangle, the pencil being raised a distance of one-half the height of the triangle. When the gradient descends and makes an angle of thirty degrees to the horizon, the triangular plate moves toward the right of Fig. 2 a distance equal to half its base, the vertical passing through the axis of the pencil then being at the extremity of the base, the pencil having descended through one-half the height of the triangle. When the gradient rises or falls one degree, the triangle is moved toward the left or right of Fig. 2 and the pencil rises or falls one-thirtieth of the half of the height of the triangle, or one-sixtieth of its height. When, then, the vehicle is on an ascending gradient, making an angle of $n$ degrees with the horizon, the pencil will rise and trace a line above a base-line corresponding to the level portion of the line, the distance between these two lines or the extent to which the pencil is raised giving the angle of the gradient with the horizon. Similarly on a down gradient the line made by the pencil will be below that for the level portion of the road, and the inclination of the gradient will be indicated by the distance between the two lines. By dividing the graphic record by a scale representing gradients of so much per cent. the up or down gradient at any point of the line may be read off at a glance by reference to the base-line indicating the horizontal distance.

The apparatus also serves to indicate the condition of the road, for if the carriage is subjected to vibrations due to the state of the permanent way these vibrations will be transmitted to the pendulum $f$, and consequently the gradient-line traced will be sinuous, the gradient being, however, indicated with sufficient accuracy by taking the median line of the undulations. Where the undulations are of abnormal amplitude, it shows that at this point the permanent way is in bad order, and in the case of a sudden shock the gradient marking-pencil will rise or descend abruptly and trace a line perpendicular to the horizontal base-line.

The speed at any point is indicated by the following arrangement, illustrated in Figs. 2, 3, and 20: A rotating shaft 18 carries a crosshead 19, connected by jointed links 20 21 22 23 to a sliding collar 24, the links 20 21 having weights 25 at their lower ends, (see Fig. 2,) which when shaft 18 is rotated fly outward and cause the collar 24 to rise in proportion to the speed of rotation. Attached to the collar 24 by rods 26 27, parallel to the shaft 18, is a ring 28, (see Figs. 2, 3, and 20,) supporting a disk 29, having a central aperture, which disk is slid along the shaft 18 by the movement of collar 24. The disk 29 is prevented from partaking in the rotary motion of ring 28 by two sleeves 30, attached to it and sliding on fixed guide-rods 31. The disk 29 is raised upon the shaft 18 proportionally to the speed of rotation of the latter, the lowering being effected by two lugs 32 on the rods 26 27, Figs. 2 and 20, engaging the said disk. Shaft 18 is rotated as follows: The wheel C, as before mentioned, receives motion from the running-wheels of the carriage in any suitable manner, and a wheel 33, Fig. 4, on the same shaft $b$ transmits motion by means of a chain to wheel 34 and so to wheel 35, Figs. 2, 3, and 4, and from the latter to a wheel 36, Fig. 2, keyed on shaft 18. The disk 29 is connected by a rod 37 to a plate 38, which slides between uprights 15, Figs. 2 and 3, and carries a pencil 39, Fig. 3, which receives vertical movement and bears upon the paper band Z. If when the apparatus is at rest a longitudinal line passing through the point of the pencil 39 be traced upon the paper band, this line will be the base of the speed-curve, Fig. 5. When the vehicle is in motion, the pencil 39 rises more or less, according to the speed, and the height of the curve from the base-line will indicate the speed of the vehicle on passing a given point. While the paper is being moved along according to the distance run and while the diagrams of the speed and gradient are being traced and during the stoppages of the train, time elapses, and we will now proceed to describe the mechanism for recording legibly the time of passing a given point, the time of stopping, and the time of starting again. For this purpose a clock or time mechanism 40, Fig. 4, imparts rotary motion—for example, one revolution every two hours—to a shaft 41, which carries a cam 42, the form of which is determined as follows: From the shaft 41 as a center is described a circle, which is divided, for example, into twelve equal parts, each corresponding to ten minutes, as shown in Fig. 7, and through these points of division are drawn radial lines, which are cut off at the following distances from the circumference of the circle:

Upon $o\ a_1$ I take $a_1\ a'_1 = 5$ millimeters.
$o\ a_2$        $a_2\ a'_2 = 10$ millimeters.
$o\ a_3$        $a_3\ a'_3 = 15$ millimeters.
$o\ a_4$        $a_4\ a'_4 = 20$ millimeters.
$o\ a_5$        $a_5\ a'_5 = 25$ millimeters.
$o\ a_6$        $a_6\ a'_6 = 30$ millimeters.
$o\ a_7$        $a_7\ a'_7 = 25$ millimeters.
$o\ a_8$        $a_8\ a'_8 = 20$ millimeters.
$o\ a_9$        $a_9\ a'_9 = 15$ millimeters.
$o\ a_{10}$      $a_{10}\ a'_{10} = 10$ millimeters.
$o\ a_{11}$      $a_{11}\ a'_{11} = 5$ millimeters.

For purposes of explanation segments corresponding to ten minutes have been taken; but for greater exactitude segments corresponding to one minute, half a minute, &c., would be used. The curve drawn through the points $a_1\ a'_1\ a'_2$ to $a'_{11}\ a$ gives the form of cam 42. Suppose that a pencil 43, whose point bears upon a band of paper, be placed at $a$, Fig. 7, and be acted on by cam 42, while prevented from moving in any but the direction of the line V V'. Suppose also that at seven o'clock the cam is in the position which it occupies in the figure. At 7.10 point $a'_1$ is on line V V' and the pencil is five millimeters higher than its previous position, the pencil rising five millimeters in ten minutes. At 7.20 o'clock the point $a'_2$ is on line V V' and the pencil is ten millimeters higher than the position occupied at seven o'clock, and so on. At eight o'clock the point $a'_6$ coincides with line V V'—viz., thirty millimeters above the position previously occupied by point $a$—the pencil having risen thirty millimeters since seven o'clock. The pencil thus traces between seven and eight o'clock a vertical line at the rate of half a millimeter per minute. From eight to nine o'clock the pencil descends under the same conditions. If the paper receives a horizontal movement, a graphic record can thus be obtained, and if upon the paper horizontal lines passing through the points of the pencil when it occupies the positions which correspond to seven o'clock and eight o'clock have been drawn the pencil will always move between these two lines. Its point will be on the lower horizontal line at seven o'clock and upon the upper horizontal line at eight o'clock and upon the lower horizontal line again at nine o'clock, and so on. The hours are thus denoted by the points of contact, Fig. 5, on the time-record with the two horizontal lines between, and the time at any given point will be indicated by the last point of contact with one of the bases, plus the number of minutes shown by the distance from this base. The pencil 43, Figs. 2, 3, and 4, whose point bears upon the band of paper Z, is carried by the plate 44, fitted to slide between the uprights 15 and operated by a lever 45, pivoted at 46, whose slotted extremity works in a slotted guide 47 and is acted on by the cam 42, before described, which is revolved by the clockwork 40, so as to impart up-and-down movement to the plate 44 and pencil 43. When the cam 42 has made a half-revolution, the pencil will be at the lowest point, (see Fig. 5,) and by the continued rotation of the cam the pencil again rises, so that when the cam has made an entire rotation the time-marking pencil has again returned to its highest point, the cam being supposed at starting to occupy the position represented in Fig. 2.

This apparatus not only furnishes a graphic record, but indicates upon dials the time, gradient, and speed of any given point.

It has been before stated that the slide 16, Fig. 2, carrying the gradient-marking-pencil holder 17, rises or falls according as the road has an up or down gradient. A rod 48, Figs. 2, 3, and 4, fixed to plate 16, terminates in an index 49, Figs. 1, 2, and 4, which follows the movements of plate 16 and rises or falls with the gradient of the road over a graduated scale, Fig. 1, being at zero at the middle of the scale when the vehicle is running on the level. When the line is on an ascending gradient, the index rises above zero and indicates upon the graduated scale that the gradient rises so much per cent. When on a down gradient, the index falls below zero and indicates on the scale that the gradient falls so much per cent. These indications enable the driver to apply the brakes at the proper moment when he is unable to see the notice-boards at the side of the railway. To the disk 29, which rises more or less on the spindle 18, according to the speed at which the train is traveling, is fixed a rod 50, which terminates in a rack 51, which gears with a toothed wheel 52 on the spindle of a pointer 53, moving over a graduated dial, Fig. 1, whereby the speed is indicated at any moment. When stopping, the pointer stands at zero on the dial. The clock 40, which actuates the hour and minute hands 54 55, is of the ordinary kind. The band of paper Z is drawn in the direction of the arrow, Fig. 5, opposite the three pencils, each of which receives vertical movement, thus producing three diagrams on the paper. (See Fig. 5.) The lowermost diagram indicates the horizontal distance, the gradient, the condition of the road, and the shocks which may occur. The line $x\,y$ gives the horizontal distance and serves as a base-line for the gradient-record. The middle diagram indicates the speed. $x'\,y'$ is the base-line for the speed-curve. When the latter meets the base-line, the speed is zero—that is to say, the vehicle is stopping. The line $x'_1\,y'_1$ is drawn parallel to $x_1\,y_1$ and is the line for the highest maximum speed allowed. When the speed-curve crosses this line, it shows that at these points the maximum speed has been exceeded. The topmost diagram indicates time—that is to say, the time of passing any point; also, stoppages, their duration and the time at which they occur, skidding, and backing. The time-recording pencil moves between the lines $x_2\,y_2$ and $x'_2\,x'_2$. When the pencil is in contact with $x_2\,y_2$, the cam 42 making one revolution in two hours, it indicates, for example, an odd hour, and when the pencil is in contact with $x'_2\,y'_2$ it is an even hour.

To read the graphic record, let it be supposed that the place on the road of which the indications are required is the point indicated by the vertical line $a^0$. The corresponding point on the lowermost diagram would be $a^0$, on the middle diagram $a_1$, and on the topmost diagram $a_2$. The line $o_1\,o\,o_2$ indicates the point of departure. This being understood, the whole graphic record, as shown in Fig. 5, is read in the following way: At the point on the road situate at a distance $o\,a^0$ from the starting-point the road rises so much per cent., which is indicated by the length $a^0\,a'$. At this point the speed was $nil$—that is to say, the train stopped at seven o'clock plus a number of minutes, indicated by the height $a_2\,m$. The stoppage continued for a number of minutes indicated by the length $m\,n$ and the train restarted at seven o'clock plus a certain number of minutes, indicated by the height $a_2\,n$. On examining the gradient-record it will be seen that the line traced from $a'$ to $e'$ is highly sinuous, thereby showing that the road is in bad condition between $a^0$ and $e^0$. At a point $b^0$, which is situated at a distance $o\,b^0$ from the starting-point, the road rises a certain percentage which is indicated by the height $b^0\,b'$. The train passed this point at a speed indicated by the height $b_1\,b'_1$, where it attained the maximum speed allowed. At the moment of passing this point it was seven o'clock plus a certain number of minutes, indicated by the distance $b_2\,b'_2$. From this point the speed still further increases, exceeds the allowed limit, and attains a maximum at point $c^0$, situated at a distance $o\,c^0$ from the starting-point. At this point the train travels at a speed indicated by $c_1\,c'_1$, the time at the moment of crossing being eight o'clock plus a number of minutes which is indicated by the height $c_2\,c'_2$. After passing this point the speed diminishes to the maximum allowed at $d^0$, which line is crossed by the speed-line at $d'_1$, the junction of line of maximum speed $x'_1$. At a point situated at a distance $o\,f$ from the starting-point the railway-line rises so much per cent. as is indicated by the height $f^0\,f'$. At this point the speed attains the maximum allowed, after which it increases still more, and then diminishes to the maximum permitted at $g'$ on line $g^0$. On examining the time-record between lines $f^0$ and $g^0$ it will be seen that it is parallel to $x^2\,y^2$, which indicates that the paper has traveled while the time-pencil has remained at the same height, the speed has been very high for a very short time, and the paper has moved along as if a certain distance had been traversed during this time, which shows that skidding has taken place at point $f^0$ and the portion of the diagram comprised between the lines $f\,f'_2$ and $g^0\,g'_2$ should be disregarded. This skidding has occurred at eight o'clock plus a number of minutes given by the height $f_2\,f'_2$, the difference between which and $g_2\,g'_2$ gives the duration of the skidding. This skidding is verified by the length of paper unwound between the starting-line $o$ and line $f^0$, and which is exaggerated in order to clearly show the principle. The distance between the stations being known, the excess marked on one record is due to the skidding indicated in the other record. At point $h^0$, situate at a distance $o\,h^0$ less $f^0\,g^0$, as above explained, from the starting-point, the gradient record indicates that the road is level and a little farther along the line, perpendicular to the horizontal distance-line, indicates that there has been a shock. The train passed this spot at a speed which is denoted by the height $h\,h'$. In passing $h^0$ the time was nine o'clock plus a certain number of minutes indicated by the height $h_2\,h'_2$. At point $p^0$, situated at a distance $o\,p^0$ less $f^0\,g^0$ from the starting-point, the speed of the train was $nil$—that is to say, it was stopped—it being then ten o'clock plus a number of minutes indicated by the height $p_2\,m_1$ and the grade descended equal to $p^0\,p'$. At point $p^0$ of the time-diagram it will be seen that instead of being continued to the right of line $p^0\,p_2$ the speed-line is retraced to the left, which denotes that from the point $p^0$ the paper has received a reverse movement, thus showing that the train has backed until a certain number of minutes after ten o'clock indicated by the line $k^2\,m^2$. It has backed from point $p^0$ to point $k^0$. At point $k^0$ the speed is $nil$. Similarly at point $p^0$, as, owing to the direction of running being reversed, the speed at these two points was necessarily $nil$ for a certain period. The stoppage at $p^0$ was from $m'\,n'$ and at $k^0$ from $m^2\,n^2$. The train started again from point $k^0$ at a certain number of minutes past ten indicated by $k_2\,n_2$ and repassed point $p^0$ at a speed denoted by $p_1\,p'_1$ at a number of minutes past eleven o'clock indicated by $p_2\,p''_2$.

The motion of the carriage is preferably transmitted to the apparatus by means of an eccentric 56, Fig. 8, keyed on the axle 57 of one of the running-wheels of the train or carriage. This eccentric is surrounded by a strap 58, whose rod 59 has a slotted link 60, in which engages a fixed pin 61, so that the end of rod 59 describes an ellipse, and the crank-pin 62, which it operates, must therefore be capable of moving toward or away from a counter-shaft or intermediate shaft 63, for which purpose the crank-arms are formed of telescopically-sliding parts 64 65. The motion thus imparted to shaft 63 is transmitted to the wheel C of the recording apparatus by any suitable means. The motion might be transmitted directly to shaft $b$ if the extremity of rod 59 described a circular movement; but it would be still necessary to employ this system of crank on account of the expansion caused by the difference of temperature. It may be so arranged that the axes of the ellipse may be very small, so that the eccentric and rod may be inclosed in a casing.

No alteration is needed in the construction of the vehicle upon which the apparatus is mounted, it being simply necessary to fix the eccentric disk 56 upon one of the wheel-axles. The dimensions of the parts of the apparatus may be varied to suit the scale of the diagrams. The time occupied by the pencil in moving from one base to the other of the time-diagram may either be one, two, or three hours, &c.

The shaft 41 of the cam 42 is balanced, as usual in clockwork, so as to rotate at a constant speed, and the holes in which the arbors are mounted may also be jeweled, if necessary.

The pencils bear constantly on the paper.

In practice it is found that the movement of solid G is efficiently transmitted to wheel $k'$ by friction whatever may be the speed.

Although the condition of the line is indicated on the diagram by the vibrations of the pendulum, these oscillations are not found to interfere with the transmission of movement by the solid G, and the vibrations may be lessened by varying the length or weight, &c., of the pendulum or by increasing the length of solid G, &c. The errors due to vibration in recording the horizontal distance traveled are inappreciable.

The record of the horizontal distance traveled may be omitted from the diagram and the movement be transmitted direct to the paper-feed roller, retaining the pencil for the gradients. In this manner instead of having the horizontal distance as base for the gradient a line giving the development of the distance traveled would be used instead.

In the case of light railways or tramways the horizontal distance-diagram may be dispensed with, retaining only the speed and time diagrams.

The diagram-paper is square-ruled to facilitate reading off, since the three pencils, being on the same vertical, correspond to the same point of the line.

To guard against shifting of the paper between the rollers either upward or downward and consequent error of the records, an additional pencil for each record may be fixed, say, to one of the uprights 15, Fig. 2, for the purposes of verification. This additional pencil will trace over again the base-line already traced upon the paper. The graduation of the speed-dial, Fig. 1, will give the speed per mile traveled in one hour, for instance. The graduation of the gradient scale will represent so many feet per one hundred.

The various mechanisms transmitting motion to the indexes and pencils may be modified, as shown in Figs. 9 to 14.

When the horizontal distance traveled is to be obtained, the motion will be transmitted to the paper by means of the solid G; otherwise it may be effected as follows: Motion is imparted to one of the cranks A on shaft B and is transmitted to the rollers C C' by the gearing D D' $D^2$ $D^3$ $D^4$ $D^5$ $D^6$ $D^7$ $D^8$ $D^9$ $D^{10}$ $D^{11}$ $D^{12}$, these rollers carrying the paper along between themselves and the roller E. The gearing is so proportioned as to give the proper speed to the paper relatively to the radius of the locomotive-wheel. The paper wound, for instance, on roller F passes between the rollers C and E, then between the stretching-roller G and the presser H, around roller G', then between the stretching-roller $G^2$ and the presser H, between rollers C' and E, and it is finally wound on the roller F'. The roller $G^2$ and the presser H are removable to enable the paper to be mounted in position, and the roller E may be pushed back for the same purpose.

Figure 12:
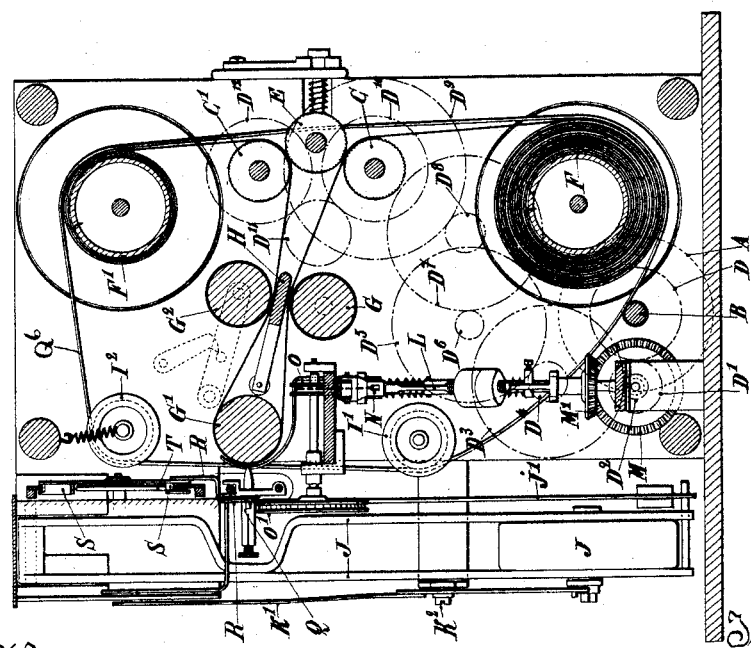

When the direction of running is reversed, the roller F winds up the paper which is unwound from roller F', these two rollers being geared together by a belt $Q^6$, as shown in Fig. 12, passing over a series of guide-rollers I' $I^2$, so as to only be in contact with the paper on the rollers F F', the paper being carried along by the rollers C C', which press against the roller E, and the motion communicated to the roller F is transmitted to roller F', and vice versa when the direction of motion is reversed, the belt by bearing on the paper insuring that such paper is wound up on one roller as it is unwound from the other. The spindles of rollers F F' are extended through the plates of the frame and provided with a crank-handle for winding up the paper, the end of which is secured in a longitudinal groove in the spool. The apparatus being graduated for a wheel of given radius, the dimensions of the parts transmitting motion to paper should be varied for a wheel of another diameter. In this example the diagram is traced, as before, by three independent pencils, the first tracing the gradient, the second the speed, and the third the time. The gradients are indicated by a pendulum J, which by a lever J' imparts sliding motion to the pencil-carrier K in a direction parallel to the axis of roller G', around which the paper passes. When the vehicle is running on a level road, the pendulum occupies its normal position, and the diagram traced by the pencil is a straight line. When the gradient rises or falls, the pendulum assumes a certain angular position, moving the pencil to the right if the gradient is a descending one (the apparatus being supposed to be mounted at the right-hand side of the locomotive) and to the left for a rising gradient, and the distance of the line traced from the line traced in the normal position indicates the amount of gradient.

The visual indication is given by an index K', movable about a fixed point $K^2$ and actuated at its lower end by a pin-and-slot engagement with the pendulum, the upper end of the index K' moving over a graduated scale, upon which may be read off the direction and amount of the gradient.

Figure 10:
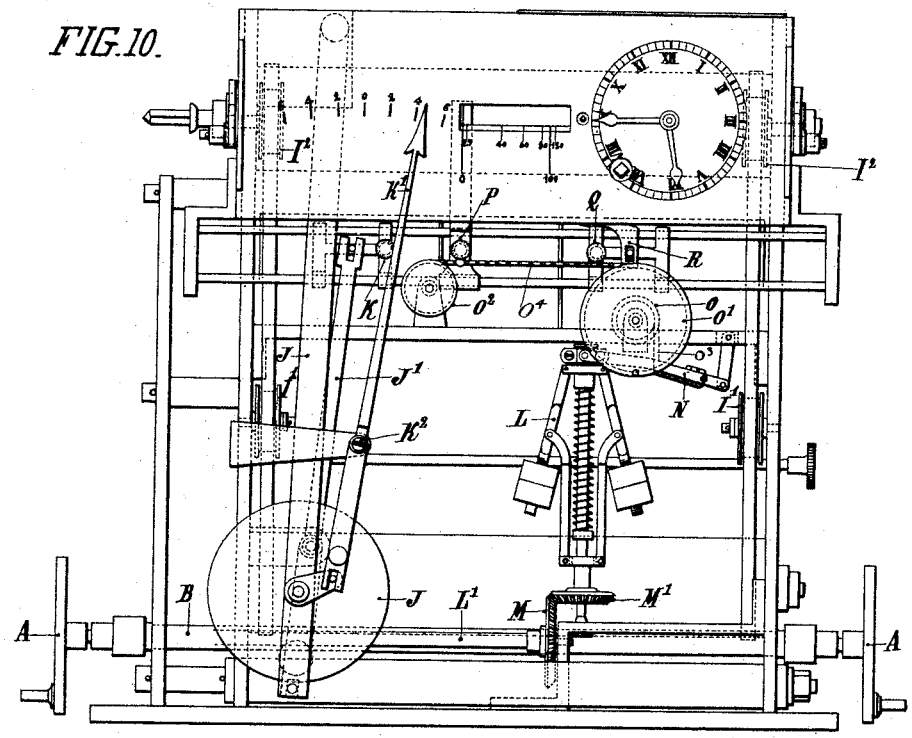
Figure 9:
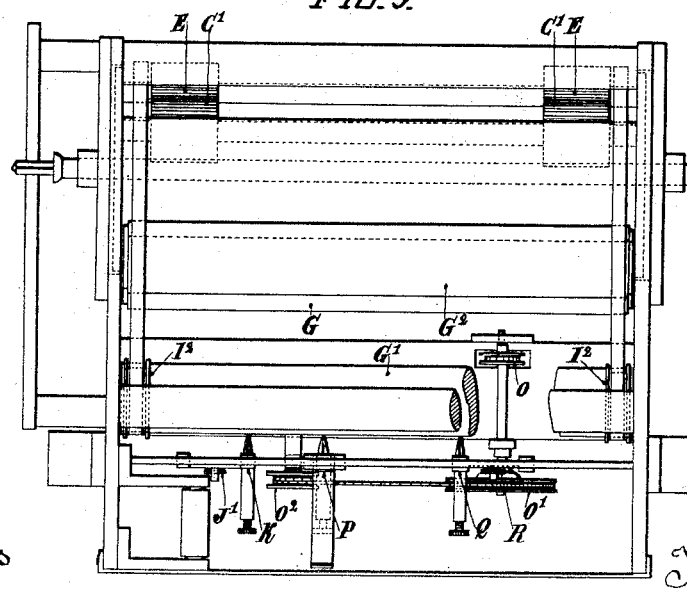

Speed is indicated, as before described, by a centrifugal indicator L, Fig. 10, actuated from the wheel of the vehicle through bevel-gear M M' by the flying out of the balls of the indicator proportionally to the speed. The lever N is caused to pull upon a chain $O^3$, passing over roller O, on whose axis is keyed the pulley O', whence leads a second chain $O^4$ to the barrel $O^2$, this chain being also fixed to the pencil-carrier P. When by the downward motion the roller O is caused to turn, it carries with it pulley O', which winds up the chain which carries along the pencil-carrier P and winds up spring-barrel $O^2$, whereby the return motion is given to the pencil-carrier P when the speed diminishes. The pencil-carrier is provided with an index which moves over a graduated scale, Fig. 10. The time is indicated visually by a clock and graphically by a pencil moving parallel to the axis of the cylinder and having a certain range of motion in a given time. The pencil-carrier Q, Fig. 10, engages by a pin in a fork R, receiving to-and-fro motion from a clockwork through the medium of a rectangular sliding frame (see Fig. 14) having two opposing racks S S, which gear alternately with the semicylindrical pinion T, fixed on one of the arbors of the clock-movement.

We claim—

1. In an indicator and recording apparatus for vehicles, the combination of the following indicating and recording apparatus in operative relation; a pendulum for indicating the gradients and the state of the road with means for transmitting motion therefrom to a recording device, a means for recording the speed comprising a centrifugal expanding mechanism provided with means for indicating and recording the extent of its expansion and a clock-movement combined with a time-cam operating to traverse a marker over the record, all substantially as described and for the purposes set forth.

2. In an indicating and recording apparatus, the combination of the following instrumentalities in operative relation, to wit: means for moving a paper record comprising a pair of rollers and means for driving the said paper record consisting of a belt or band in contact with the paper; a pendulum and means for transmitting motion therefrom to a marker or pencil which marks upon the record paper or strip, a rotary velometer for indicating the speed comprising a centrifugal expanding device having means for transmitting its motion of expansion and contraction to a pencil or marker combined with means for marking a time-record comprising time mechanism and a heart-shaped time-cam, substantially as described and for the purposes set forth.

3. An indicating apparatus for indicating and recording the horizontal distance traveled by a vehicle consisting of a marking means and a record for receiving impressions of the said marking means and means for moving the said marking means comprising in its structure a solid of revolution generated by a curve varying as the cosine of the angle which the road or line makes with the horizontal and means for shifting the said solid and a wheel of invariable radius receiving motion from the solid and governing the extent of the recording functions of the marking apparatus.

4. In an indicating apparatus for indicating and recording the horizontal distance traveled by a railroad-train, the combination of a means for making a record comprising in its structure a solid of revolution generated by a curve varying as the cosine of the angle which the railroad or line makes with the horizontal, a wheel of invariable radius receiving motion from the said solid of revolution and means for shifting the solid of revolution with respect to the wheel of invariable radius, substantially as described.

5. In an apparatus for indicating and recording the horizontal distance traveled by a railroad car, train or other vehicle, the combination of means for making a record, comprising in its structure a solid of revolution generated by a curve varying as the cosine of the angle which the road or line makes with the horizontal and transmitting motion to an element of the recording apparatus and a pendulum for shifting the solid of revolution.

The foregoing specification of our indicating and registering apparatus for vehicles, and more especially for railway-vehicles, signed by us this 2d day of July, 1896.

ENNEMOND FAYE.
GEORGES STEPHANE JEAN BAPTISTE BOCHET.

Witnesses:
   A. JOUFFRAY,
   MORRIS VACHOY.